June 30, 1925
W. R. NOTVEST
1,543,866
METHOD OF TESTING SLATE FOR ELECTRICAL PURPOSES
Filed May 15, 1923
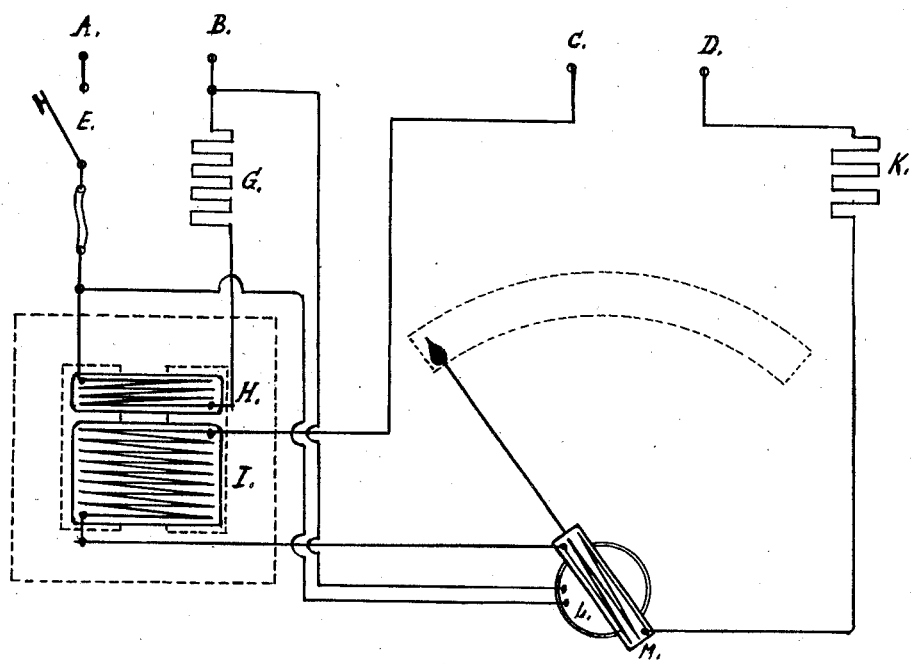
Witness.
Inventor.
W. Robert Notvest.
Cleveland, O.

Patented June 30, 1925.

1,543,866

UNITED STATES PATENT OFFICE.

WILLIAM ROBERT NOTVEST, OF EUCLID, OHIO.

METHOD OF TESTING SLATE FOR ELECTRICAL PURPOSES.

Application filed May 15, 1923. Serial No. 639,181.

*To all whom it may concern:*

Be it known that I, WILLIAM ROBERT NOTVEST, a subject of the German Empire, having declared my intention to become a citizen of the United States, and residing at Mosspoint, Euclid Village, Cuyahoga County, Ohio, have invented a new and useful Method of Testing Slate for Electrical Purposes, of which the following is a specification.

My invention relates to improvements in the method of testing slate for electrical purposes.

The main object of my invention is to determine the dielectric characteristics of slate by means of a uniform scale dynamometer type milli-ammeter. By means of such dynamometer and specially designed circuits and apparatus, I am enabled to determine the insulation value or leakage in slate and show by direct reading upon the dynamometer the actual amount of leakage in the slate.

The apparatus and circuits are such that a skilled operator is not necessary and further means are provided so that the operator is protected when high voltage currents are used for testing purposes.

Slate sometimes contains two to five per cent metallic oxides such as ferric ($Fe_2O_3$), ferrous oxide (FeO) and pyrites ($FeS_2$) capable of assuming a capacity charge under high potentials, also interconnected with each other through one half to 1 per cent to 2 per cent of carbon in graphitic form representing an ohmic resistance so that leakage in slate under high potential alternating currents represents an impedance effect caused by the capacities in series with ohmic resistances.

I obtained the object of accurately measuring this impedance effect in slate by the apparatus and circuits illustrated in the accompanying drawing wherein:

A and B represent the terminals to which the supply current of either 110 or 220 volts alternating current at 60 or 25 cycles single phase may be connected.

The design of the transformer is of course to be suitable for the particular type current used. A snap switch E is inserted between a suitable fuse and the primary winding H of the transformer.

A non-inductive resistance coil G is placed in series with the winding H of the transformer and serves to limit the amount of current induced in the secondary winding I of the transformer and to hold the current within predetermined limits. This limitation serves to protect the operator from injury due to excessive current.

The milli-ammeter used is of the dynamometer type of the usual design being provided with the movable coil M and the fixed coil L. Instead of having two coils in series the movable coil M is in series with the secondary winding I of the transformer and the resistance coil K.

The fixed coil is connected across the battery or source of current supply leads extending to the primary winding H of the transformer. This source of current supply serves to energize the coil L.

The test terminals C and D of the high tension circuit are connected by means of suitable cables and metallic contact brushes to the slate specimen to be tested. The secondary voltage of the transformer may vary from 2200 to 4400 volts according to requirements. This variation in voltage can be accomplished by changing the ratio between the windings of the primary and secondary coils of the transformer.

The non-inductive resistance K in series with the secondary winding of the transformer serves to prevent an excessive voltage drop under a slight flow of leakage current. The ratio or arrangement of the windings of the transformer are arranged to compensate for such a resistance inserted in series with the secondary winding.

Prior to my invention slate has been tested with high voltage alternating currents and the impedance effect measures by either ascertaining the voltage drop in the primary winding of the transformer or determining the increase in current consumption.

With my invention, however, an actual reading is given by the electrical measuring instrument or milli-ammeter showing the amount of leakage in the slate.

Therefore I claim for my invention:

1. In a device for testing slate, the combination of a transformer provided with primary and secondary windings, a source of current supply in circuit with said primary winding, a resistance coil interposed between said primary winding and the source of current, an electrical measuring instrument provided with a movable and a fixed coil, a circuit extending from the source of current for the primary of the transformer to the fixed coil of the measuring instrument, test terminals, a second resistance coil, a circuit extending to said terminals including the secondary winding of the transformer the second mentioned resistance coil and the winding of the movable coil of the measuring instrument, said circuits and resistances so proportioned that any leakage in the slate is indicated by said electrical measuring instrument.

2. In a device for testing slate, the combination of a transformer provided with primary and secondary windings, a measuring instrument provided with a fixed coil and a movable coil, the movable coil being in series with the secondary winding of said transformer, while the fixed coil is connected to a source of current, the source of current also connected to said primary winding to energize said fixed coil and to increase the voltage through said secondary winding so the leakage in the slate is indicated by said measuring instrument.

3. In a device for testing slate, the combination of a transformer provided with primary and secondary winding, a source of current supply in circuit with said primary windings, an electrical measuring instrument provided with a movable and a fixed coil, a circuit extending from the source of current for the primary winding of the transformer to the fixed coil of the measuring instrument, a circuit extending from the secondary winding of the transformer to the winding of the movable coil of the measuring instrument, said circuits and coils so proportioned that resistance of the slate is indicated by said electrical measuring instrument.

WILLIAM ROBERT NOTVEST.

Witness:
M. S. DORNBACH.